United States Patent
Hwang et al.

(10) Patent No.: US 9,215,661 B2
(45) Date of Patent: Dec. 15, 2015

(54) TRANSMISSION POWER CONTROL METHOD AND DEVICE FOR COGNITIVE RADIO DEVICE

(75) Inventors: Sung-Hyun Hwang, Daejeon (KR); Gwangzeen Ko, Daejeon (KR); Chang-Joo Kim, Daejeon (KR); Myung-Sun Song, Daejeon (KR); Jung-Sun Um, Daejeon (KR); Min-Sheo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 359 days.

(21) Appl. No.: 13/266,931

(22) PCT Filed: Apr. 29, 2010

(86) PCT No.: PCT/KR2010/002724
§ 371 (c)(1),
(2), (4) Date: Jan. 10, 2012

(87) PCT Pub. No.: WO2010/126322
PCT Pub. Date: Nov. 4, 2010

(65) Prior Publication Data
US 2012/0100883 A1   Apr. 26, 2012

Related U.S. Application Data

(60) Provisional application No. 61/173,650, filed on Apr. 29, 2009, provisional application No. 61/178,533, filed on May 15, 2009, provisional application No. 61/187,697, filed on Jun. 17, 2009, provisional application No. 61/242,536, filed on Sep. 15, 2009, provisional application No. 61/242,860, filed on Sep. 16, 2009.

(51) Int. Cl.
*H04W 52/04* (2009.01)

(52) U.S. Cl.
CPC ............................ *H04W 52/04* (2013.01)

(58) Field of Classification Search
CPC ..... H04W 52/08; H04W 52/383; H04L 45/28
USPC .......................................................... 455/522
See application file for complete search history.

(56) References Cited

U.S. PATENT DOCUMENTS 7,408,907 B2 *   8/2008   Diener .......................... 370/338
7,424,268 B2 *   9/2008   Diener et al. ................... 455/62
(Continued)

FOREIGN PATENT DOCUMENTS

KR   1020090038254 A   4/2009
WO   WO2009050588 A2   4/2009

OTHER PUBLICATIONS

Chang-Joo Kim et al., Proposed Text for Section 3.10 Control Mechanisms, ECMA International, Apr. 2009.
(Continued)

*Primary Examiner* — Hai V Nguyen
(74) *Attorney, Agent, or Firm* — William Park & Associates Ltd.

(57) ABSTRACT

A method and an apparatus for controlling transmit power of a CR device are provided. The method includes acquiring CR environment information regarding a licensed user or an unlicensed user occupying an adjacent channel or an adjacent cell of the CR device; determining a transmit power value of the CR device using the CR environment information; and generating transmit power control information including the transmit power value. The method and apparatus guarantee reliable communication of the CR device and minimize interference with the licensed user.

16 Claims, 6 Drawing Sheets

(56) References Cited

U.S. PATENT DOCUMENTS

| | | | |
|---|---|---|---|
| 7,907,904 B2* | 3/2011 | Waltho et al. | 455/63.1 |
| 7,990,912 B2* | 8/2011 | Nix et al. | 370/328 |
| 8,041,380 B2* | 10/2011 | Hamdi et al. | 455/522 |
| 8,135,417 B2* | 3/2012 | Shan et al. | 455/456.5 |
| 8,208,373 B2* | 6/2012 | Bonta et al. | 370/228 |
| 8,315,663 B2* | 11/2012 | Hamdi et al. | 455/522 |
| 8,320,948 B2* | 11/2012 | Li et al. | 455/509 |
| 8,346,178 B2* | 1/2013 | Morita | 455/69 |
| 8,385,436 B2* | 2/2013 | Holm et al. | 375/260 |
| 8,437,700 B2* | 5/2013 | Mody et al. | 455/67.11 |
| 8,442,445 B2* | 5/2013 | Mody et al. | 455/67.11 |
| 8,521,094 B2* | 8/2013 | Hamdi et al. | 455/67.11 |
| 8,547,889 B2* | 10/2013 | Jeon et al. | 370/311 |
| 8,559,379 B2* | 10/2013 | Gainey et al. | 370/329 |
| 8,599,731 B2* | 12/2013 | Jeon et al. | 370/311 |
| 8,879,573 B2* | 11/2014 | Bahl et al. | 370/445 |
| 2004/0047324 A1* | 3/2004 | Diener | 370/338 |
| 2007/0042733 A1* | 2/2007 | Tomioka | 455/179.1 |
| 2007/0183392 A1* | 8/2007 | Tandai et al. | 370/350 |
| 2007/0202867 A1* | 8/2007 | Waltho et al. | 455/423 |
| 2007/0287465 A1 | 12/2007 | Hyon et al. | |
| 2008/0207248 A1* | 8/2008 | Tang | 455/522 |
| 2009/0011774 A1* | 1/2009 | Shan et al. | 455/456.1 |
| 2009/0082057 A1* | 3/2009 | Hwang et al. | 455/522 |
| 2009/0124205 A1* | 5/2009 | Aboba et al. | 455/63.1 |
| 2009/0124207 A1* | 5/2009 | Mody et al. | 455/67.11 |
| 2009/0197627 A1* | 8/2009 | Kuffner et al. | 455/522 |
| 2009/0270025 A1* | 10/2009 | Kossi et al. | 455/3.01 |
| 2010/0027517 A1* | 2/2010 | Bonta et al. | 370/338 |
| 2010/0238879 A1* | 9/2010 | Jeon et al. | 370/329 |
| 2010/0248769 A1* | 9/2010 | Li et al. | 455/509 |
| 2010/0330919 A1* | 12/2010 | Gurney et al. | 455/67.11 |
| 2011/0019603 A1* | 1/2011 | Jeon et al. | 370/311 |
| 2011/0090841 A1* | 4/2011 | Shyy et al. | 370/319 |
| 2011/0312368 A1* | 12/2011 | Hamdi et al. | 455/522 |
| 2013/0035133 A1* | 2/2013 | Hamdi et al. | 455/522 |

OTHER PUBLICATIONS

Chang-Joo Kim et al., Proposed Text for Section 6.10 Control Mechanisms, ECMA International, May 2009.

Chang-Joo Kim et al., Proposed Text for Section 6.10 Control Mechanisms, ECMA International, Jun. 2009.

Chang-Joo Kim et al., Proposed Text for Transmit Power Control IE(TPCIE), ECMA International, Sep. 2009.

Chang-Joo Kim et al., Transmit Power Control for Protable CR, ECMA International, Sep. 2009.

\* cited by examiner

FIG. 4

| | State of first adjacent channel | Type of signals in adjacent cell regarding operating cell | | |
|---|---|---|---|---|
| State of adjacent cell | | No signal | Other unlicensed signal or unknown signals | Licensed signals (TV, WM, etc) |
| Type of signals in adjacent cell regarding operating cell | No signal | $P_{i,NS1} =$ 100-$P_{i,MS,64QAM}$ mW (50-$P_{i,MS,64QAM}$ mW) | $P_{i,NS2} =$ $P_{i,NS1} \geq P_{i,NS} \geq P_{i,NS3}$ mW ($P_{i,NS1} \geq P_{i,NS} \geq P_{i,NS3}$ mW) | $P_{i,NS3} =$ 40-$P_{i,MS,64QAM}$ mW (40-$P_{i,MS,64QAM}$ mW) |
| | Other unlicensed signal or unknown signals | $P_{i,NS4} =$ $P_{i,NS1} \geq P_{i,NS} \geq P_{i,NS3}$ mW ($P_{i,NS1} \geq P_{i,NS} \geq P_{i,NS3}$ mW) | $P_{i,NS2} \geq P_{i,NS}$, $P_{i,NS4} \geq P_{i,NS} \geq P_{i,NS5}$ mW ($P_{i,NS2} \geq P_{i,NS}$, $P_{i,NS4} \geq P_{i,NS} \geq P_{i,NS5}$ mW) | $P_{i,NS5} =$ $P_{i,NS3} \geq P_{i,NS}$ mW ($P_{i,NS3} \geq P_{i,NS}$ mW) |

FIG. 5

| Modulation scheme | Initial transmit power |
|---|---|
| 64QAM | $P_{i,MS,64QAM} =$ 100 $\geq P_{i,MS}$ mW (50 $\geq P_{i,MS}$ mW) |
| 16QAM | $P_{i,MS,16QAM} =$ $P_{i,MS,64QAM} \geq P_{i,MS}$ mW ($P_{i,MS,64QAM} \geq P_{i,MS}$ mW) |
| QPSK | $P_{i,MS,QPSK} =$ $P_{i,MS,16QAM} \geq P_{i,MS}$ mW ($P_{i,MS,16QAM} \geq P_{i,MS}$ mW) |

FIG. 6

| State of adjacent cell \ State of first adjacent channel | | Type of signals in adjacent cell regarding operating cell | | |
|---|---|---|---|---|
| | | No signal | Other unlicensed signal or unknown signals | Licensed signals (TV, WM, etc) |
| Type of signals in adjacent cell regarding operating cell | No signal | $\Delta P_{NS1} = \pm 2 - \Delta P_{MS,64QAM}$ dB ($\pm 1 - \Delta P_{MS,64QAM}$ dB) | $\Delta P_{NS2} = \pm \Delta P_{NS1} \geq \Delta P_{NS} \geq \Delta P_{NS3}$ dB ($\pm \Delta P_{NS1} \geq \Delta P_{NS} \geq \Delta P_{NS3}$ dB) | $\Delta P_{NS3} = \pm \Delta P_{NS2} \geq \Delta P_{NS}$ dB ($\pm \Delta P_{NS2} \geq \Delta P_{NS}$ dB) |
| | Other unlicensed signal or unknown signals | $\Delta P_{NS1} = \pm \Delta P_{NS1} \geq \Delta P_{NS} \geq \Delta P_{NS3}$ dB ($\pm \Delta P_{NS1} \geq \Delta P_{NS} \geq \Delta P_{NS3}$ dB) | $\pm \Delta P_{NS2} \geq \Delta P_{NS}$, $\pm \Delta P_{NS4} \geq \Delta P_{NS} \geq \Delta P_{NS5}$ dB ($\pm \Delta P_{NS2} \geq \Delta P_{NS}$, $\Delta P_{NS4} \geq \Delta P_{NS} \geq \Delta P_{NS5}$ dB) | $\Delta P_{NS5} = \pm \Delta P_{NS3} \geq \Delta P_{NS}$ dB ($\pm \Delta P_{NS3} \geq \Delta P_{NS}$ dB) |

FIG. 7

| Modulation scheme | Power update value |
|---|---|
| 64QAM | $\Delta P_{MS,64QAM} = \pm 2 \geq \Delta P_{MS}$ dB ($\pm 1 \geq \Delta P_{MS}$ dB) |
| 16QAM | $\Delta P_{MS,16QAM} = \pm \Delta P_{MS,64QAM} \geq \Delta P_{MS}$ dB ($\pm \Delta P_{MS,64QAM} \geq \Delta P_{MS}$ dB) |
| QPSK | $\Delta P_{MS,QPSK} = \pm \Delta P_{MS,16QAM} \geq \Delta P_{MS}$ dB ($\pm \Delta P_{MS,16QAM} \geq \Delta P_{MS}$ dB) |

TRANSMISSION POWER CONTROL METHOD AND DEVICE FOR COGNITIVE RADIO DEVICE

TECHNICAL FIELD

Exemplary embodiments of the present invention relate to a method and an apparatus for controlling transmit power; and, more particularly, to a method and an apparatus for controlling transmit power of a cognitive radio device.

BACKGROUND ART

Rapid development of wireless communication technology is followed by depletion of frequency resources. Almost all frequency bands are exclusively allocated to a" number of respective wireless communication services, with few frequency bands left to be allocated to new wireless communication services to be developed in the future.

However, frequency bands allocated to some wireless communication services are not used efficiently. For example, cellular network bands are overloaded in most parts of the world, but amateur radio or paging frequency bands are not.

One of technologies discussed recently to solve the problem of insufficient radio resources is Cognitive Radio (CR) technology, which searches for radio resources having degraded utilization efficiency and shares frequency radio resources without interference with existing systems, which have been assigned corresponding frequencies and used them, thereby improving radio resource efficiency.

In the CR technology, a user formally licensed to use a specific frequency band is referred to as a primary user, a licensed user, or an incumbent user, and a user not licensed to use a specific frequency band is referred to as a secondary user or an unlicensed user.

A factor requiring the most important consideration in the CR technology is the problem of interference of unlicensed users with licensed users. One of the problems that need to be solved to guarantee high spectrum efficiency without interference with licensed users is transmit power control of CR devices of unlicensed users. That is, every CR device must have a transmit power control function which guarantees reliable communication while avoiding interference with any licensed user.

DISCLOSURE OF THE INVENTION

Technical Problem

An embodiment of the present invention is directed to a method and an apparatus for controlling transmit power of a cognitive radio device, which can guarantee reliable communication of the cognitive radio device while minimizing interference with licensed users.

Another embodiment of the present invention is directed to a method and an apparatus for controlling transmit power of a cognitive radio device more efficiently by considering various factors.

Another embodiment of the present invention is directed to a method and an apparatus for controlling transmit power of a cognitive radio device, which facilitate coexistence between homogeneous and heterogeneous systems and minimize power consumption of the cognitive radio device.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Means for Solving the Objectives

In accordance with an embodiment of the present invention, a method for controlling transmit power of a Cognitive Radio (CR) device includes: acquiring CR environment information regarding a licensed user or an unlicensed user occupying an adjacent channel or an adjacent cell of the CR device; determining a transmit power value of the CR device using the CR environment information; and generating transmit power control information including the transmit power value.

In accordance with another embodiment of the present invention, an apparatus for controlling transmit power of a CR device includes: an information acquisition unit configured to acquire CR environment information regarding a licensed user or an unlicensed user occupying an adjacent channel or an adjacent cell of the CR device; a power determination unit configured to determine a transmit power value of the CR device using the CR environment information; and an information generation unit configured to generate transmit power control information including the transmit power value.

In accordance with another embodiment of the present invention, a method for controlling transmit power of a CR device includes: acquiring at least one of CR environment information regarding a licensed user or an unlicensed user occupying an adjacent channel or an adjacent cell of the CR device, transmission scheme information regarding the CR device, and signal quality information regarding the CR device; determining a transmit power value of the CR device using at least one of the CR environment information, the transmission scheme information, and the signal quality information; and generating transmit power control information including the transmit power value.

In accordance with another embodiment of the present invention, an apparatus for controlling transmit power of a CR device includes: an information acquisition unit configured to acquire at least one of CR environment information regarding a licensed user or an unlicensed user occupying an adjacent channel or an adjacent cell of the CR device, transmission scheme information regarding the CR device, and signal quality information regarding the CR device; a power determination unit configured to determine a transmit power value of the CR device using at least one of the CR environment information, the transmission scheme information, and the signal quality information; and an information generation unit configured to generate transmit power control information including the transmit power value.

EFFECTS OF THE INVENTION

In accordance with the exemplary embodiments of the present invention, the method and apparatus for controlling transmit power of a CR device guarantee reliable communication of the CR device while minimizing interference with licensed users.

In addition, the method and apparatus control transmit power of a CR device more efficiently by considering various factors.

Furthermore, the method and apparatus facilitate coexistence between homogeneous and heterogeneous systems and minimize power consumption of the CR device.

BRIEF DESCRIPTION OF THE DRAWINGS

FIG. 4 shows an example of setting of an initial transmit power value considering an adjacent signal in accordance with the fourth embodiment of the present invention.

FIG. 5 shows an example of setting of an initial transmit power value considering a modulation scheme in accordance with the fourth embodiment of the present invention.

FIG. 6 shows an example of setting of a power update value considering an adjacent signal in accordance with the fourth embodiment of the present invention.

FIG. 7 shows an example of setting of a power update value considering a modulation scheme in accordance with the fourth embodiment of the present invention.

DESCRIPTION OF SPECIFIC EMBODIMENTS

Figure 1:
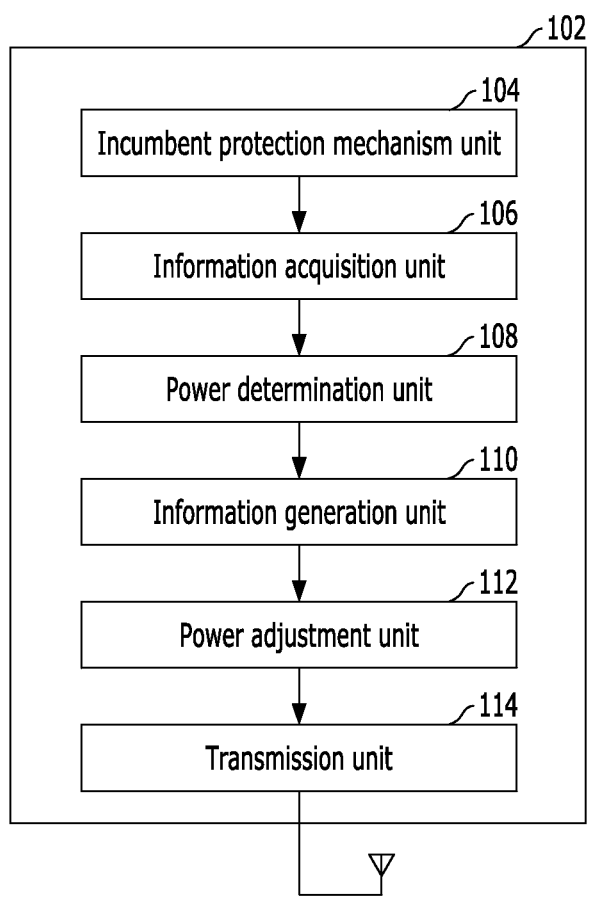
FIG. 1 illustrates a method for controlling the transmit power of a CR device in accordance with a first embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In the following description, a user formally licensed to use a specific frequency band, i.e. a primary user, a licensed user, or an incumbent user, will hereinafter be referred to as a licensed user. In addition, a user not licensed to use a specific frequency band, i.e. a secondary user or an unlicensed user, will be referred to as an unlicensed user.

In a CR system, every device must provide a Transmit Power Control (TPC) function. The purpose of TPC is to guarantee that a CR device uses minimum transmit power enabling reliable communication, to prevent interference with licensed users, and to alleviate interference with other unlicensed users. This facilitates coexistence between homogeneous and heterogeneous systems and reduces power consumption of the device. In order to fulfill these purposes, the transmit power of the device needs to be optimized within a short period of time.

The transmit power of a CR device can be defined by Equation 1 below.

$$P_{next} = \begin{cases} P_i, & \text{at the first transmission} \\ P_{prev} + \Delta P, & \text{following the first transmission} \end{cases} \quad \text{Eq. 1}$$

where, $P_{next}$ refers to a transmit power value to be determined, $P_i$ refers to an initial transmit power value, $P_{prev}$ refers to a previous transmit power value, and $\Delta P$ refers to a power update value.

Referring to Equation 1, the CR device uses the initial transmit power value $P_i$ at the first signal transmission and, when the transmit power needs to be changed later, the power level is adjusted using the power update value $\Delta P$. Therefore, the core principle of the transmit power control mechanism in a CR system is that, based on consideration of neighboring environments, transmission scheme, etc., the initial transmit power and power update values are determined.

Therefore, in accordance with the present invention, the transmit power of a CR device is controlled using CR environment information, CR device transmission scheme information, CR device signal quality information, etc.

A channel currently occupied by a CR device in a CR system is referred to as an operating channel, and a channel adjacent to the operating channel is referred to as an adjacent channel. A cell currently occupied by a CR device is referred to as an operating cell, and a cell adjacent to the operating cell is referred to as an adjacent cell (or neighboring network).

CR environment information refers to information regarding the neighboring environment of a CR device, e.g. its adjacent channel or adjacent cell. More specifically, the CR environment information refers to information regarding a licensed user or an unlicensed user occupying an adjacent channel or an adjacent cell of a CR device. The CR environment information includes user existence/nonexistence information regarding whether another user exists or not in the neighboring environment, user type information regarding whether a user existing in the neighboring environment is a licensed user or an unlicensed user, user number information regarding the number of users existing in the neighboring environment, and user frequency position information regarding the frequency position of a user existing in the neighboring environment.

In accordance with the present invention, such CR environment information is used to control the transmit power of a CR device. For example, the initial transmit power and power update values of a CR device can be adjusted according to whether a licensed user or an unlicensed user exists in an adjacent channel. The initial transmit power and power update values of a CR device can also be determined based on consideration of the number of licensed or unlicensed users existing in an adjacent cell or an adjacent cell, as well as their frequency position.

When no signal exists either in adjacent channels or in adjacent cells, the initial transmit power or power update value of a CR device can be allowed up to the maximum value. However, when a licensed user or an unlicensed user appears in an adjacent channel or an adjacent cell, the initial transmit power or power update value is decreased.

Power control can be varied according to the type of a signal appearing in an adjacent channel or an adjacent cell. For example, the power level of a CR device when a licensed user has appeared must be equal to or lower than that when an unlicensed user has appeared. Therefore, a suitable weighting factor can be applied so that power control reflects information regarding the number and frequency position of other users existing in the neighboring environment of a CR device.

CR environment information can be acquired by a function referred to as a controlling mechanism or an incumbent protection mechanism. Examples of the incumbent protection mechanism include a geolocation function, which is currently used in CR systems, a database function, a spectrum sensing function, and a cognition pilot channel function (or dedicated frequency band for CR). A CR device in accordance with an embodiment of the present invention can directly perform such an incumbent protection mechanism and acquire CR environment information. Alternatively, the CR device can acquire CR environment information from another device having an incumbent protection mechanism. When the CR device has at least one incumbent protection mechanism or when the CR device can acquire at least one piece of CR environment information from another device having an incumbent protection mechanism, the acquired information can be combined variously according to the performance and reliability of the corresponding incumbent protection function.

In accordance with the present invention, the transmit power of a CR device can be controlled according to the signal transmission scheme of the CR device. Examples of the transmission scheme include a modulation scheme and a coding scheme. For example, a device using a high-order modulation scheme may require higher transmit power to maintain link quality. Furthermore, in order to rapidly adjust the transmit power level, a device using a high-order modulation scheme may require a power level larger than the power update value of a device using a low-order modulation scheme.

Hereinafter, a method and an apparatus for controlling the transmit power of a CR device in accordance embodiments of the present invention will be described in more detail.

First Embodiment

FIG. 1 illustrates a method for controlling the transmit power of a CR device in accordance with a first embodiment of the present invention.

Referring to FIG. 1, a CR device 102 includes an incumbent protection mechanism unit 104, an information acquisition unit 106, a power determination unit 108, an information generation unit 110, a power adjustment unit 112, and a transmission unit 114.

The incumbent protection mechanism unit 104 is configured to perform an incumbent protection mechanism, specifically at least one of a geolocation function, a database function, a spectrum sensing function, and a cognition pilot channel function, and acquire CR environment information. The CR environment information includes at least one of user existence/nonexistence information, user type information, user number information, and user frequency position information.

The information acquisition unit 106 is configured to acquire CR environment information from the incumbent protection mechanism unit 104. Besides the CR environment information, the information acquisition unit 106 may also acquire information regarding the modulation scheme or signal quality of the CR device 102. The transmission scheme information may include information regarding the modulation scheme or coding scheme of the CR device 102. The signal quality information may include parameters (e.g. RSSI, CINR, PER) indicating the signal quality of the CR device 102.

The power determination unit 108 is configured to determine a transmit power value of the CR device 102 using CR environment information acquired by the information acquisition unit 106. For example, the power determination unit 108 can determine an initial transmit power or power update value of the CR device 102 using information regarding whether another user exists in an adjacent channel or an adjacent cell of the CR device 102, information regarding the type, number, and frequency position of other uses existing in an adjacent channel or an adjacent cell. Besides the CR environment information, the power determination unit 108 may also consider transmission scheme information or signal quality information acquired by the information acquisition unit 106 and determine the transmit power.

When the CR device 102 has an adjacent channel or an adjacent cell occupied by a licensed user or another unlicensed user, the power determination unit 108 decreases the transmit power value of the CR device 102 from the previous value. This reduces interference of the CR device 102 with another user occupying an adjacent channel or an adjacent cell.

When an adjacent channel or an adjacent cell is occupied by a licensed user, the power determination unit 108 determines a transmit power value of the CR device 102 smaller than when an adjacent channel or an adjacent cell is occupied by an unlicensed user. In addition, the power determination unit 108 determines a transmit power value, when the CR device 102 uses a high-order modulation scheme, larger than when a low-order modulation scheme is used.

The information generation unit 110 is configured to generate transmit power control information including a transmit power value determined by the power determination unit 108. The power adjustment unit 112 is configured to adjust the transmit power of the CR device 102 according to the transmit power control information generated by the information generation unit 110. The transmission unit 114 is configured to transmit a signal using the adjusted transmit power.

Second Embodiment

Figure 2:
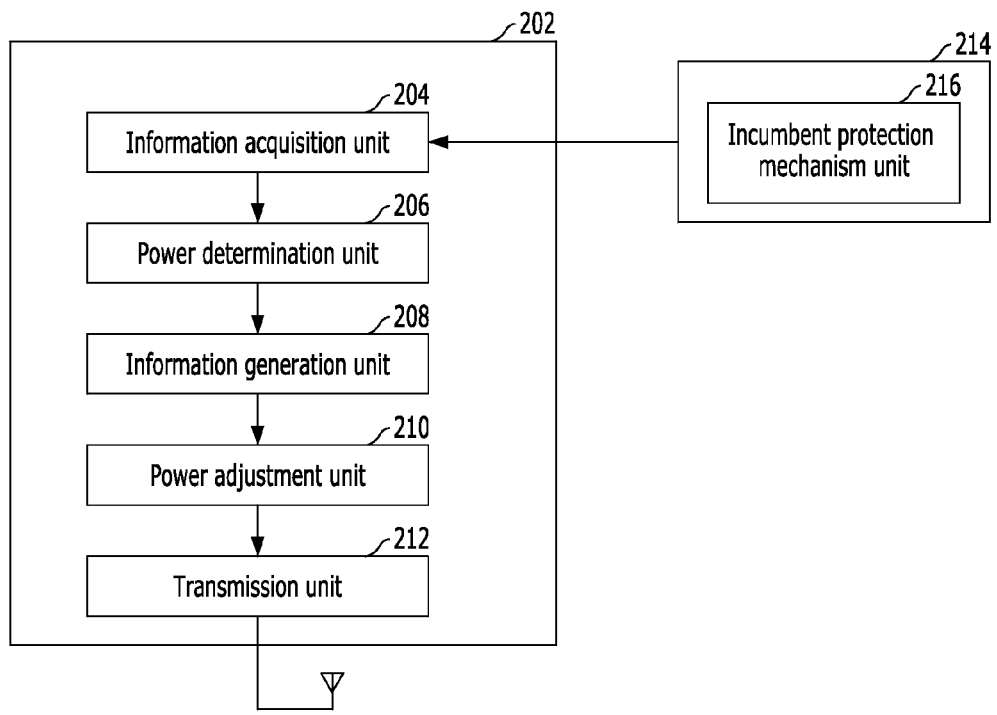
FIG. 2 illustrates a method for controlling the transmit power of a CR device in accordance with a second embodiment of the present invention.

FIG. 2 illustrates a method for controlling the transmit power of a CR device in accordance with a second embodiment of the present invention.

Referring to FIG. 2, the CR device 202 includes an information acquisition unit 204, a power determination unit 206, an information generation unit 208, a power adjustment unit 210, and a transmission unit 212. The functionality of the acquisition unit 204, the power determination unit 206, the information generation unit 208, the power adjustment unit 210, and the transmission unit 212 of the CR device 202 is the same as that of the information acquisition unit 106, the power determination unit 108, the information generation unit 110, the power adjustment unit 112, and the transmission unit 114 of the CR device 102 illustrated in FIG. 1, and repeated description thereof will be omitted herein.

It is to be noted, however, that the CR device 202 illustrated in FIG. 2 has no incumbent protection mechanism function, unlike the CR device 102 illustrated in FIG. 1. Therefore, the information acquisition unit 204 of the CR device 202 can acquire CR environment information from another device 214 including an incumbent protection mechanism unit 216.

Except for this, the method for controlling the transmit power by the CR device 202 is the same as the CR device 102 illustrated in FIG. 1.

Third Embodiment

Figure 3:
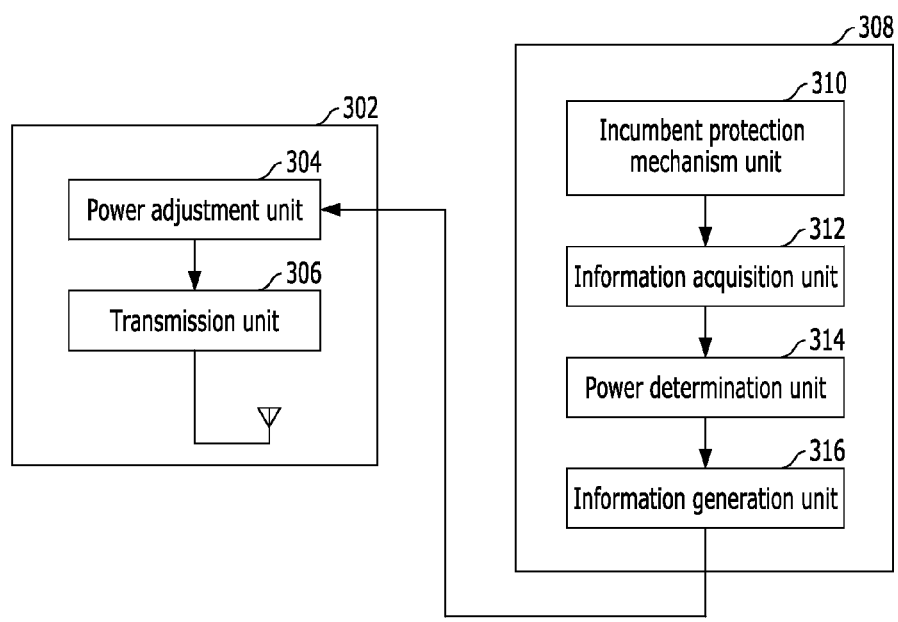
FIG. 3 illustrates a method for controlling the transmit power of a CR device in accordance with a third embodiment of the present invention.

FIG. 3 illustrates a method for controlling the transmit power of a CR device in accordance with a third embodiment of the present invention.

Referring to FIG. 3, the CR device 302 includes a power adjustment unit 304 and a transmission unit 306. The CR device 302 is configured to receive transmit power control information from another device 308, which includes an incumbent protection mechanism unit 310, an information acquisition unit 312, a power determination unit 314, and an information generation unit 316, and adjust the transmit power using the transmit power control information.

The device 308 is configured to acquire CR environment information through the incumbent protection mechanism unit 310 and transfer the information to the information acquisition unit 312. The power determination unit 314 is configured to determine a transmit power value of the CR device 302 using the CR environment information transferred by the information acquisition unit 312. The information generation unit 316 is configured to generate transmit power control information, which includes the determined transmit power value, and transmit the information to the CR device 302.

Table 1 below gives an example of the transmit power control information generated by the information generation unit 316. Specifically, Table 1 shows the format of a transmit power control IE, which is a MAC control message.

TABLE 1

| Syntax | Size | Notes |
| --- | --- | --- |
| Transmit_Power_Control_IE_Format { | | |
| Element ID | 1 byte | Set to the value that identifies the information element |
| Length (= 1+3×N) | 1 byte | |
| N | 1 byte | Number of TPC fields |
| For (i=1, i <=N, i++){ | | |
| TPC$_i$ | 3 bytes | Refer to Table 2 |
| } | | |
| } | | |

Table 2 below shows the format of the TPC field given in Table 1.

TABLE 2

| Syntax | Size | Notes |
| --- | --- | --- |
| TPC_Field_Format { | | |
| DevAddr | 16 bits | DEV address of destination device |
| Transmit Power | 8 bits | See Table 3 |
| } | | |

Table 3 below shows field encoding of Transmit Power given in Table 2.

TABLE 3

| Value | Power (mW) |
| --- | --- |
| 0 | 1 |
| 1 | 2 |
| 2 | 3 |
| ... | ... |
| 98 | 99 |
| 99 | 100 |
| 100-255 | reserved |

Fourth Embodiment

Control of transmit power using CR environment information and CR device modulation scheme information in accordance with an embodiment of the present invention will now be described. It will be assumed in the description of this embodiment that an incumbent protection mechanism simultaneously observes the situations of an adjacent channel and an adjacent cell of a CR device.

Power of a CR device has been defined by Equation 1 described above. Therefore, transmit power control of the CR device can be divided into control of the initial transmit power control value $P_i$ and control of the power update value $\Delta P$ and considered separately.

The initial transmit power value $P_i$ can be divided into a power value considering an adjacent signal and a power value considering a modulation scheme, as defined by Equation 2 below.

$$P_i = P_{i,NS} + P_{i,MS}$$ Eq. 2 wherein, $P_{i,NS}$ refers to an initial transmit power value considering an adjacent signal, and $P_{i,MS}$ refers to an initial transmit power value considering a modulation scheme. The $P_{i,NS}$ is determined by considering the situations of an adjacent channel and an adjacent cell acquired by the incumbent protection mechanism function. In accordance with this embodiment, only a first adjacent channel is considered as an adjacent channel. As used herein, the first adjacent channel refers to a channel closest to the operating channel of the CR device.

FIG. 4 shows an example of setting of the initial transmit power value considering an adjacent signal in accordance with the fourth embodiment of the present invention. For example, when there is no signal in either the first adjacent channel or in adjacent cells, $P_{i,NS}$ becomes a value lower than the maximum transmit power allowed (100 mW) by $P_{i,MS,64\ QAM}$, i.e. 100 mW−$P_{i,MS,64\ QAM}$. However, when a licensed signal or an unlicensed signal appears in the first adjacent channel regarding the operating cell and in an adjacent cell regarding the operating cell, $P_{i,NS}$ may decrease gradually. For example, when a different unlicensed signal appears in the first adjacent channel and when there is no different signal in adjacent cells, $P_{i,NS}$ is set to be a value smaller than or equal to $P_{i,NS1}$ and larger than or equal to $P_{i,NS3}$.

In FIG. 4, power values in parentheses correspond to cases in which information regarding situations of an adjacent channel and an adjacent cell has been acquired by an incumbent protection mechanism with lower reliability. For example, reliability of the spectrum sensing function is lower than that of the database function, so when information acquired by the spectrum sensing function is used, the initial transmit power may be limited to a larger degree.

The $P_{i,MS}$ is determined by considering the modulation scheme of the CR device. It will be assumed in the description of this embodiment that, as the modulation scheme, QPSK, 16 QAM, and 64 QAM are used respectively.

FIG. 5 shows an example of setting of the initial transmit power value considering a modulation scheme in accordance with the fourth embodiment of the present invention. When the modulation scheme of 64 QAM is currently used, $P_{i,MS}$ can be set to be a value smaller than or equal to 100, i.e. a maximum of 100 mW. The lower the order of modulation scheme becomes (in the order of 16 QAM and QPSK), the smaller the $P_{i,MS}$ is set. In FIG. 5, power values in parentheses correspond to cases in which an incumbent protection mechanism with lower reliability is used.

Using Equation 2 and FIGS. 4 and 5, the initial transmit power of a CR device can be determined in the following manner: Assuming that neighboring environment information acquired by the CR device is from a function with higher reliability (e.g. database function), the initial transmit power cannot exceed 40 mW when a licensed user appears in the first adjacent channel, and the initial transmit power is allowed up to 100 mW when there is no signal either in the first adjacent channel or in any adjacent cell. In contrast, assuming that a function with lower reliability (e.g. spectrum sensing function) is used, the initial transmit power is allowed up to 50 mW when there is no signal either in the first adjacent channel or in any adjacent cell.

As in the case of Equation 2, the power update value ΔP of Equation 1 can be divided into a power update value considering an adjacent signal and a power update value considering a modulation scheme, as defined by Equation 3 below.

$$\Delta P = \Delta P_{NS} + \Delta P_{MS} \qquad \text{Eq. 3}$$

wherein, $\Delta P_{NS}$ refers to a power update value considering an adjacent signal, and $\Delta P_{MS}$ refers to a power update value considering a modulation scheme. The $\Delta P_{NS}$ is determined by considering the situations of an adjacent channel and an adjacent cell acquired by the incumbent protection mechanism function. In accordance with this embodiment, only the first adjacent channel is considered as an adjacent channel.

FIG. 6 shows an example of setting of the power update value considering an adjacent signal in accordance with the fourth embodiment of the present invention. The power update value of FIG. 6 is determined in a manner similar to that of FIG. 4. For example, when there is no signal either in the first adjacent channel or in any adjacent cell, $\Delta P_{NS}$ has a value of maximum 2±dB.

The $\Delta P_{MS}$ is determined by considering the modulation scheme of the CR device. It will be assumed in the description of this embodiment that, as the modulation scheme, QPSK, 16 QAM, and 64 QAM are used respectively.

FIG. 7 shows an example of setting of the power update value considering a modulation scheme in accordance with the fourth embodiment of the present invention. The power update value of FIG. 7 is determined in a manner similar to that of FIG. 5. For example, when the modulation scheme of 64 QAM is currently used, $\Delta P_{MS}$ has a value of maximum 2±dB.

Using Equation 3 and FIGS. 6 and 7, the power update value of a CR device can be determined in the following manner: Assuming that neighboring environment information acquired by the CR device is from a function with higher reliability (e.g. database function), the power update value is set to the minimum value when a licensed user or an unlicensed user appears in the first adjacent channel or in an adjacent cell, and the power update value is allowed up to ±2 dB when there is no signal. In contrast, assuming that a function with lower reliability (e.g. spectrum sensing function) is used, the power update value is allowed up to ±1 dB when there is no signal either in the first adjacent channel or in any adjacent cell.

Figure 8:
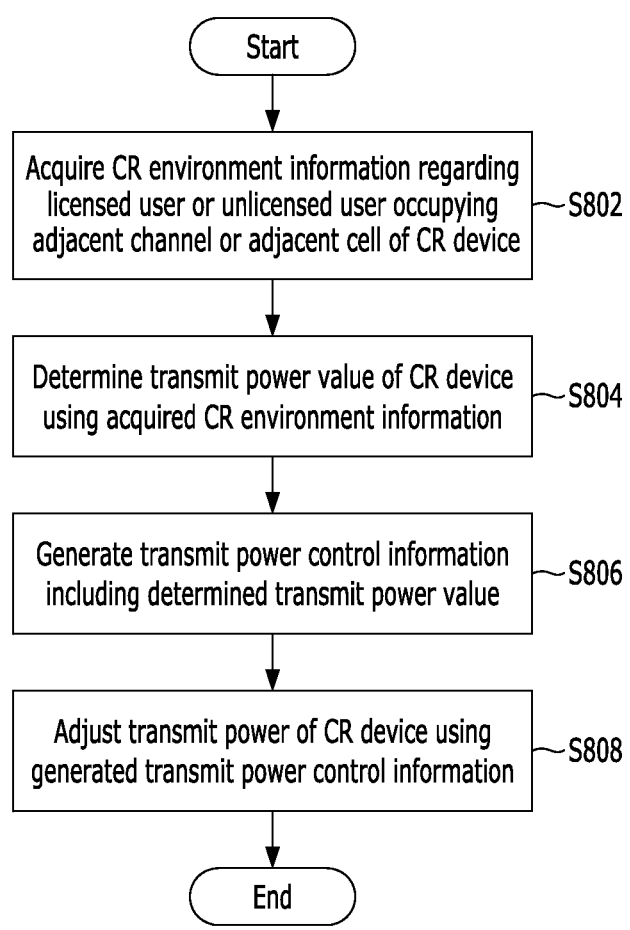
FIG. 8 is a flowchart illustrating a method for controlling the transmit power of a CR device in accordance with an embodiment of the present invention.

FIG. 8 is a flowchart illustrating a method for controlling the transmit power of a CR device in accordance with an embodiment of the present invention.

CR environment information regarding a licensed user or an unlicensed user occupying an adjacent channel or an adjacent cell of a CR device is acquired at step S802. The CR environment information can be acquired by at least one of a geolocation function, a database function, a spectrum sensing function, and a cognition pilot channel function. The CR environment information may include at least one of user existence/nonexistence information, user type information, user number information, and user frequency position information.

The transmit power value of the CR device is determined using the acquired CR environment information at step S804. When the transmit power value is determined, the transmit power may be reduced when a licensed user or an unlicensed user occupies an adjacent channel or an adjacent cell of the CR device. Furthermore, when it is a licensed user who occupies the adjacent channel or the adjacent cell, the transmit power value may be set smaller than when an unlicensed user occupies the adjacent channel or the adjacent cell.

After the transmit power value is determined, transmit power control information including the determined transmit power value is generated at step S806. The transmit power of the CR device is adjusted using the generated transmit power control information at step S808.

Figure 9:
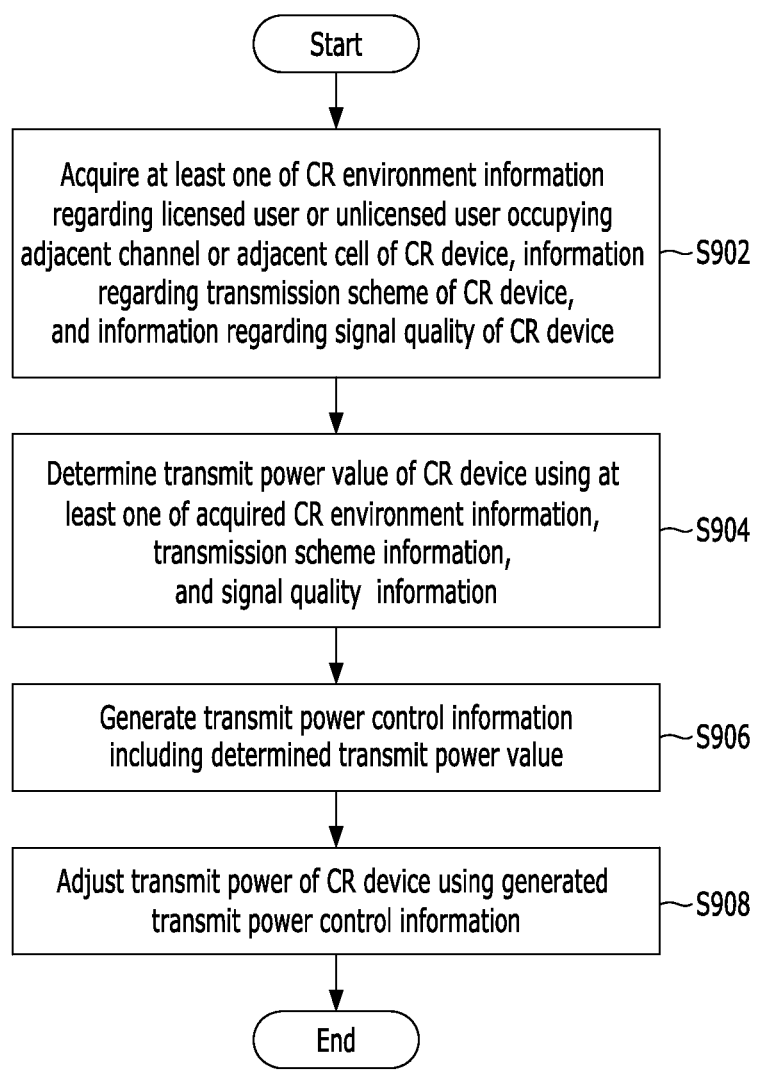
FIG. 9 is a flowchart illustrating a method for controlling the transmit power of a CR device in accordance with another embodiment of the present invention.

FIG. 9 is a flowchart illustrating a method for controlling the transmit power of a CR device in accordance with another embodiment of the present invention.

At least one of CR environment information regarding a licensed user or an unlicensed user occupying an adjacent channel or an adjacent cell of a CR device, information regarding the transmission scheme of the CR device, and information regarding the signal quality of the CR device is acquired at step S902. The CR environment information can be acquired by at least one of a geolocation function, a database function, a spectrum sensing function, and a cognition pilot channel function. The CR environment information may include at least one of user existence/nonexistence information, user type information, user number information, and user frequency position information. The transmission scheme information may include at least one of information regarding the modulation scheme of the CR device and information regarding the coding scheme of the CR device.

The transmit power value of the CR device is determined using at least one of the acquired CR environment information, transmission scheme information, and signal quality information at step S904. When the transmit power value is determined, the transmit power may be reduced when a licensed user or an unlicensed user occupies an adjacent channel or an adjacent cell of the CR device. Furthermore, when it is a licensed user who occupies the adjacent channel or the adjacent cell, the transmit power value may be set smaller than when an unlicensed user occupies the adjacent channel or the adjacent cell. In addition, the transmit power value when the CR device uses a high-order modulation scheme may be set larger than a value when the CR device uses a low-order modulation scheme.

After the transmit power value is determined, transmit power control information including the determined transmit power value is generated at step S906. The transmit power of the CR device is adjusted using the generated transmit power control information at step S908.

While the present invention has been described with respect to the specific embodiments, it will be apparent to those skilled in the art that various changes and modifications may be made without departing from the spirit and scope of the invention as defined in the following claims.

What is claimed is:

1. A method for controlling transmit power of a Cognitive Radio (CR) device, comprising:
   acquiring (CR) environment information regarding a licensed user or an unlicensed user occupying an adjacent channel or an adjacent cell of the CR device;
   determining a transmit power value of the CR device using the CR environment information; and
   generating transmit power control information comprising the transmit power value,
   wherein the transmit power control information is included in a MAC control message having a format of transmit power control IE,
   wherein the CR environment information is acquired by a cognition pilot channel function,
   wherein the transmit power value includes initial transmit power and power update values, wherein the initial transmit power and the power update values are respectively determined based on a signal in the adjacent channel or the adjacent cell and a modulation scheme of the CR device, wherein the initial transmit power and the power update values are gradually decreased accordingly as an appearance of the signal is gradually increased in the adjacent channel or the adjacent cell, and wherein the initial transmit power and the power update values are configured to be smaller accordingly as an order of the modulation scheme becomes lower.

2. The method of claim 1, wherein the CR environment information is further acquired by at least one of a geolocation function, a database function, and a spectrum sensing function.

3. The method of claim 1, wherein the CR environment information comprises at least one of user existence/nonexistence information, user type information, user number information, and user frequency position information.

4. The method of claim 1, wherein said determining a transmit power value of the CR device using the CR environment information comprises:

decreasing the transmit power value when a licensed user or an unlicensed user occupies the adjacent channel or the adjacent cell.

5. The method of claim 1, wherein said determining a transmit power value of the CR device using the CR environment information comprises:

determining the transmit power value, when a licensed user occupies the adjacent channel or the adjacent cell, to be smaller than or equal to a value when an unlicensed user occupies the adjacent channel or the adjacent cell.

6. The method of claim 1, further comprising:

adjusting transmit power of the CR device using the transmit power control information.

7. An apparatus for controlling transmit power of a Cognitive Radio (CR) device, comprising:

an information acquisition unit configured to acquire (CR) environment information regarding a licensed user or an unlicensed user occupying an adjacent channel or an adjacent cell of the CR device;

a power determination unit configured to determine a transmit power value of the CR device using the CR environment information; and an information generation unit configured to generate transmit power control information comprising the transmit power value, wherein the transmit power control information is included in a MAC control message having a format of transmit power control IE, wherein the CR environment information is acquired by a cognition pilot channel function, wherein the transmit power value includes initial transmit power and power update values, wherein the initial transmit power and the power update values are respectively determined based on a signal in the adjacent channel or the adjacent cell and a modulation scheme of the CR device, wherein the initial transmit power and the power update values are gradually decreased accordingly as an appearance of the signal is gradually increased in the adjacent channel or the adjacent cell, and wherein the initial transmit power and the power update values are configured to be smaller accordingly as an order of the modulation scheme becomes lower.

8. A method for controlling transmit power of a Cognitive Radio (CR) device, comprising:

acquiring at least one of (CR) environment information regarding a licensed user or an unlicensed user occupying an adjacent channel or an adjacent cell of the CR device, transmission scheme information regarding the CR device, and signal quality information regarding the CR device;

determining a transmit power value of the CR device using at least one of the CR environment information, the transmission scheme information, and the signal quality information; and generating transmit power control information comprising the transmit power value, wherein the transmit power control information is included in a MAC control message having a format of transmit power control IE, wherein the CR environment information is acquired by a cognition pilot channel function, wherein the transmit power value includes initial transmit power and power update values, wherein the initial transmit power and the power update values are respectively determined based on a signal in the adjacent channel or the adjacent cell and a modulation scheme of the CR device, wherein the initial transmit power and the power update values are gradually decreased accordingly as an appearance of the signal is gradually increased in the adjacent channel or the adjacent cell, wherein the initial transmit power and the power update values are configured to be smaller accordingly as an order of the modulation scheme becomes lower, and wherein the transmission scheme information includes the modulation scheme and a coding scheme of the CR device.

9. The method of claim 8, wherein the CR environment information is further acquired by at least one of a geolocation function, a database function, and a spectrum sensing function.

10. The method of claim 8, wherein the CR environment information comprises at least one of user existence/nonexistence information, user type information, user number information, and user frequency position information.

11. The method of claim 8, wherein the transmission scheme information comprises at least one of modulation scheme information regarding the CR device and coding scheme information regarding the CR device.

12. The method of claim 8, wherein said determining a transmit power value of the CR device using at least one of the CR environment information, the transmission scheme information, and the signal quality information comprises:

decreasing the transmit power value when a licensed user or an unlicensed user occupies the adjacent channel or the adjacent cell.

13. The method of claim 8, wherein said determining a transmit power value of the CR device using at least one of the CR environment information, the transmission scheme information, and the signal quality information comprises:

determining the transmit power value, when a licensed user occupies the adjacent channel or the adjacent cell, to be smaller than or equal to a value when an unlicensed user occupies the adjacent channel or the adjacent cell.

14. The method of claim 8, wherein said determining a transmit power value of the CR device using at least one of the CR environment information, the transmission scheme information, and the signal quality information comprises:

determining the transmit power value, when the CR device uses a high-order modulation scheme, to be larger than a value when the CR device uses a low-order modulation scheme.

15. The method of claim 8, further comprising:
adjusting transmit power of the CR device using the transmit power control information.

16. An apparatus for controlling transmit power of a Cognitive Radio (CR) device, comprising:
an information acquisition unit configured to acquire at least one of CR environment information regarding a licensed user or an unlicensed user occupying an adjacent channel or an adjacent cell of the CR device, transmission scheme information regarding the CR device, and signal quality information regarding the CR device;
a power determination unit configured to determine a transmit power value of the CR device using at least one of the CR environment information, the transmission scheme information, and the signal quality information; and
an information generation unit configured to generate transmit power control information comprising the transmit power value,
wherein the transmit power control information is included in a MAC control message having a format of transmit power control IE,
wherein the CR environment information is acquired by a cognition pilot channel function,
wherein the transmit power value includes initial transmit power and power update values,
wherein the initial transmit power and the power update values are respectively determined based on a signal in the adjacent channel or the adjacent cell and a modulation scheme of the CR device,
wherein the initial transmit power and the power update values are gradually decreased accordingly as an appearance of the signal is gradually increased in the adjacent channel or the adjacent cell,
wherein the initial transmit power and the power update values are configured to be smaller accordingly as an order of the modulation scheme becomes lower, and
wherein the transmission scheme information includes the modulation scheme and a coding scheme of the CR device.

* * * * *